3,282,405
TUBULAR CONVEYORS
Charles R. Larson, 532 Capital, Bellevue, Mich., and John
J. Wallace, 5131 Maple Ridge Drive, Kalamazoo, Mich.
Filed Sept. 8, 1964, Ser. No. 394,930
9 Claims. (Cl. 198—168)

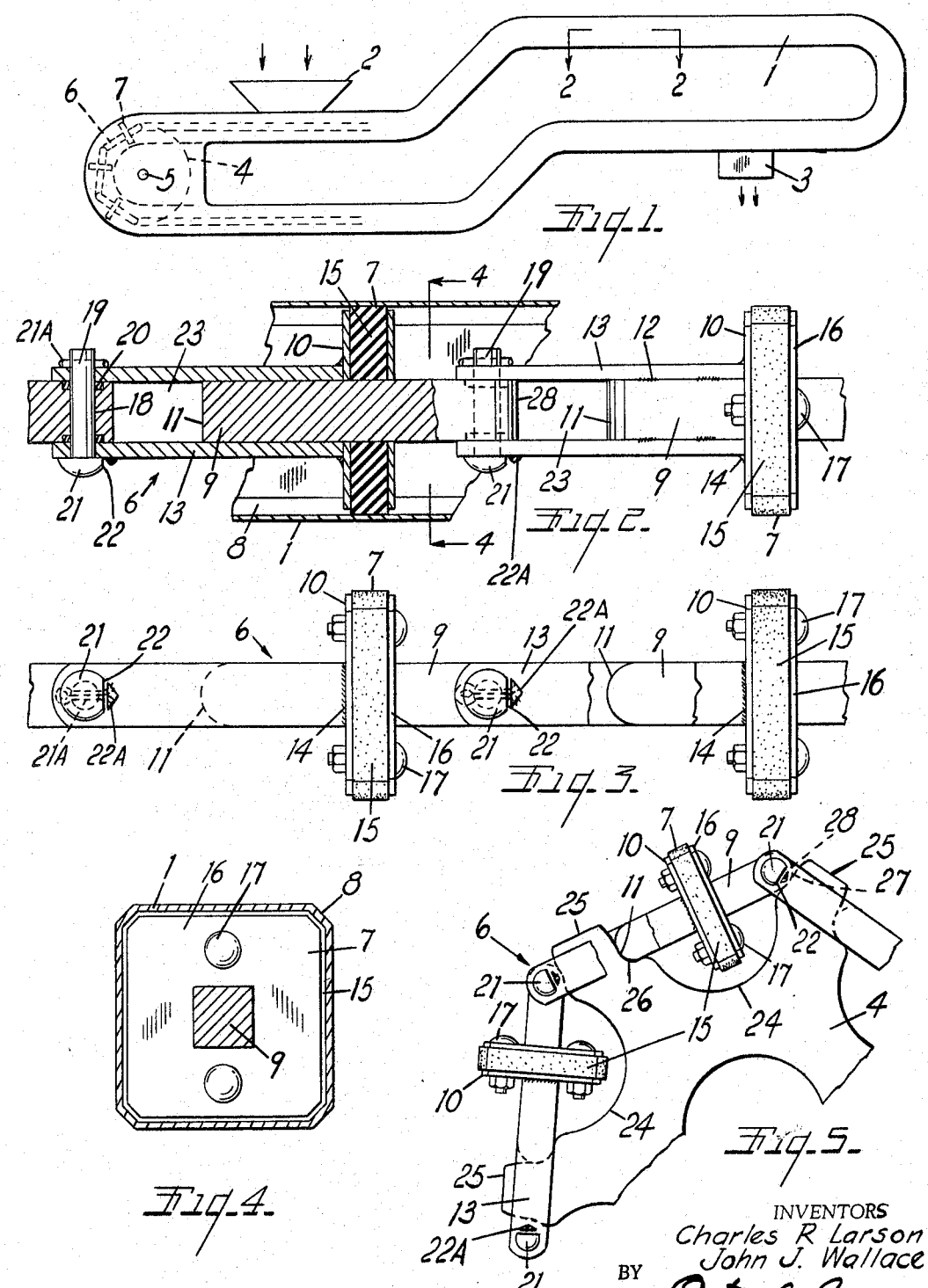

This invention relates to improvements in tubular conveyors. The principal objects of this invention are:

First, to provide a tubular conveyor of the type having an enclosed tube with a chain traveling therealong and having spaced flights on the chain fitting within the walls of the tube to advance material through the tube in which the chain and flights are incorporated by a novel arrangement which eliminates half of the pivots of the chain thus reducing the cost of the conveyor.

Second, to provide a combined pushed flight and conveyor chain link for a tubular conveyor which will coact with similar flight and link elements to form a conveyor chain capable of moving around convex and concave turns in a tubular conveyor.

Third, to provide a novel form of driving and guiding sprocket for a tubular conveyor chain made up of successive links each having a pusher flight of the conveyor rigidly connected thereto.

Fourth, to provide a conveyor having the foregoing characteristics and advantages which is less expensive and longer wearing than prior conveyors of similar type due to its having fewer relatively moveable or bearing parts and surfaces, and in which the wearing surfaces are protected against the entry of abrasive or other wear creating materials therebetween.

Other objects and advantages of the invention will be apparent from a consideration of the following description and claims. The drawings, of which there is one sheet, illustrate a highly practical form of the invention.

FIG. 1 is a side elevational view of one possible arrangement of the tubular conveyor of the invention.

FIG. 2 is a fragmentary cross sectional view taken along the plane of the line 2—2 in FIG. 1.

FIG. 3 is a fragmentary side elevational view of the conveyor chain and flights projected from the sectional view of FIG. 2.

FIG. 4 is a transverse cross sectional view taken along the plane of the line 4—4 in FIG. 2.

FIG. 5 is a fragmentary side elevational view of the conveyor chain and driving sprocket therefor of the conveyor.

The example of the conveyor illustrated includes a conveying tube 1 arranged in a circuitous path to receive material through the feeding hopper 2 and deliver the material through a discharge throat 3. A driving sprocket 4 mounted on a drive shaft 5 drives a conveyor chain indicated generally by the numeral 6 and having a plurality of longitiudinally spaced flight blocks 7 for pushing material through the tube. The tube may be of any cross section and as appears from FIG. 4 the particular tube illustrated is of generaly rectangular cross section with beveled corners 8.

The chain 6 and flight blocks 7 consist of a central bar 9 of rectangular cross section passed through the center of a rear pusher plate 10 and projecting substantially to the rear thereof. The rearwardly projecting end of the bar 9 is rounded as at 11 in the plane of the conveyor tube 1 and is secured as by welding at 12 between a pair of rearwardly projecting link plates 13. The forward ends of the link plates 13 are abutted against and welded to the back side of the pusher plate 10 as at 14 and project rearwardly behind the rounded end 11 of the bar 9.

Forwardly of the pusher plate 10 there is provided a slightly enlarged flight block 15 of deformable or other material which contacts the inner surface of the tube 1. The block 15 is held in place by a retaining plate 16 and clamp bolts 17 passed through the clamp plate, block and pusher plate. The center bar 9 of the flight block projects substantially forwardly from the clamp plate 16 and is provided with a transverse hole 18 receiving the pivot pin 19. Sealing gaskets 20 recessed into the end of the bar 9 around the pivot pin 18 prevent the entry of dust or other abrading material into the bearing surface between the bar 9 and the pin 18. The bar 9 pivots on the pin 18 between the link plates 13. The pivot pin 18 has a head 21 that is flattened as at 22 and abutted against a welded projection 22A on one of the link plates so that the pivot pin does not turn in the pivot holes but is still removable for disassembly or repair of the conveyor. The pins cannot fall out of the pivotal connection between the bars and the link plates because of cotter or cross pins 21A passed through the other ends of the pins. The space 23 between the forward end of the bar 9 and the rounded rear end 11 of the preceding bar receives the teeth of a driving sprocket wheel to be described.

The sprocket wheel 4 has a plurality of arcuate peripheral recesses 24 spaced to receive successive pusher or flight blocks 7 of the conveyor and conveyor chain and leaving a series of radially projecting teeth 25. The forward or leading sides of the teeth 25 have forwardly and outwardly concave surfaces 26 sized to engage the rounded rear ends 11 of the bars 9 to impart forward thrust to the bars and to prevent the chain from moving radially inwardly of the sprocket. The rear sides of the teeth 25 are shaped or curved as at 27 in generally radially inwardly extending but in radially inwardly diverging relation to the front faces of the teeth to engage the leading ends of the bars 9. The leading ends of the bars 9 are rounded as at 28 to provide radially inward bearing support between front ends of the bars and the trailing sides of the teeth.

The structure of the conveyor chain and pusher flights is thus extremely simple and inexpensive to manufacture and assemble. The bars 9 are identical elements having rounded ends 11 and 28 with the pivot hole 18 and recesses for the seals 20 formed in one end thereof. The link plates are identical parts having one squared end which abuts against the pusher plate 10. The pusher plate 10 and the clamp plate 16 can be identical parts with a hole in the center for receiving the bar 9. Each flight block assembly with its central bar 9 and link plate extensions extending therebehind are identical and are connected to each other to form the entire conveyor and flight block assembly. The flights or blocks 7 are positioned approximately two thirds of the distance forwardly from the rear ends of the rigid center bars 9 and link plates 13 from the rear pivot pins 19 so that there is ample space for the teeth 25 to enter into the space 23 and push the rigid flight block and link assembly with the flight block received in the peripheral recesses 24 of the sprocket. The forwardly directed pressure of the teeth 25 on the blocks 9 is transmitted as tension through the link plates 13 to the trailing bar and block assembly. Tension is thus applied closely adjacent the flight blocks as they are pulled around corners in the tube 1 and the relatively elongated rear end of the link and block assembly transmits the tension force behind each block to the succeeding following bar and block.

Each center bar and link plate extension assembly constitutes a rigid bar that is bifurcated at its trailing end and sized at its leading end to fit between the bifurcations of a similar assembly. The seals 20 recessed into the bars around the pins 19 keep the pivot bearing surfaces between the pins and the bars clean.

What is claimed as new is:
1. In a tubular conveyor having a closed tube arranged in a plane with an inlet opening at one position and an outlet opening from an advanced position along the tube, a conveyor for advancing material through said tube comprising a plurality of similar center bar and pusher flight assemblies, said center bars having ends rounded in the plane of said tube and having pusher plates positioned midway of their length and around the bars, link plates welded to the sides of said bars behind said pusher plates in planes parallel to the plane of said tube and having their forward ends secured by welding to said pusher plates, said link plates projecting rearwardly from the rear ends of said bars and having pivot holes in their rear ends, flight blocks positioned around said bars and against said pusher plates and projecting beyond the edges of the pusher plates, clamp plates positioned around said bars and clamped against the leading sides of said flight blocks by bolts passed through said pusher plates and clamp plates, pivot holes formed through the forward ends of said bars perpendicular to the plane of said tube and having annular seal recesses formed around the ends of the pivot holes, the forward ends of said bars fitting between the rearwardly projecting ends of said link plates on the preceding bar, pivot pins passed through said holes in said link plates and said bars having heads flatted on one side and restrained against rotation by projections welded to one of said link plates, cross pins passed through the other ends of said pivot pins removably holding the pivot pins in place, deformable seals in said seal recesses around said pivot pins and compressed therearound by said link plates, and a driving sprocket positioned in the plane of said tube and having peripheral recesses spaced to receive said flight blocks with teeth between the recesses having forward edges with forwardly and outwardly curved shoulders conforming to the curved rear ends of said bars and having rear edges curved in radially inwardly divergent relation to the forward edges of said teeth to engage the leading ends of succeeding bars.

2. In a tubular conveyor having a closed tube arranged in a plane with an inlet opening at one position and an outlet opening from an advanced position along the tube, a conveyor for advancing material through said tube comprising a plurality of similar center bar and pusher flight assemblies, said center bars having ends rounded in the plane of said tube and having pusher plates positioned intermediate of their length and around the bars, link plates secured to the sides of said bars behind said pusher plates in planes parallel to the plane of said tube and having their forward ends abutted against said pusher plates, said link plates projecting rearwardly from the rear ends of said bars and having pivot holes in their rear ends, flight blocks positioned around said bars and against said pusher plates and projecting beyond the edges of the pusher plates, pivot holes formed through the forward ends of said bars perpendicular to the plane of said tube, the forward ends of said bars fitting between the rearwardly projecting ends of preceding link plates, pivot pins passed through said holes in said link plates and said bars and secured against rotation relative to one of said link plates, a driving sprocket positioned in the plane of said tube and having peripheral recesses spaced to receive said flight blocks with teeth between the recesses having forward edges with forwardly and outwardly curved shoulders conforming to the curved rear ends of said bars and having contoured rear edges disposed in radially inwardly diverging relation to the forward edges of said teeth.

3. In a tubular conveyor having a closed tube arranged in a plane with an inlet opening at one position and an outlet opening from an advanced position along the tube, a conveyor for advancing material through said tube comprising a plurality of similar center bar and flight block assemblies, said center bars having ends rounded in the plane of said tube and having pusher plates positioned intermediate of their length and around the bars, link plates secured to the sides of said bars behind said pusher plates in planes parallel to the plane of said tube, said link plates projecting rearwardly from the rear ends of said bars and having pivot holes in their rear ends, pivot holes formed through the forward ends of said bars perpendicular to the plane of said tube with seal recesses around the ends of the holes, the forward ends of said bars fitting between the rearwardly projecting ends of said link plates, pivot pins passed through said holes in said link plates and said bars and secured against rotation, seals in said seal recesses compressed around said pivot pins, a driving sprocket positioned in the plane of said tube and having peripheral recesses spaced to receive said flight blocks with teeth between the recesses having forward edges with forwardly and outwardly facing shoulders conforming to the rounded rear ends of said bars and having contoured rear edges disposed in diverging relation to the forward edges of said teeth to radially support the forward ends of said center bars.

4. A conveyor assembly for a tubular conveyor comprising, a plurality of similar link members having their trailing ends bifurcated and their other ends sized to fit between the bifurcation of an adjacent link member, pivot holes formed through the ends of said link members and spaced from the base of said bifurcations, rearwardly convexly rounded surfaces formed on said link members toward the rear ends thereof at the base of said bifurcations and spaced forwardly from the pivot holes in the rear ends of the link members, forwardly convex surfaces on the forward ends of said link members, pusher flights secured to said link members in spaced relation between said rounded surfaces and the pivot holes in the forward ends of the link members and projecting rigidly normal to the link members, pivot pins connecting the ends of said link members through said pivot holes, a drive sprocket positioned in a turn of said conveyor and having peripheral recesses sized to receive said pusher flights in clearing relation, and teeth on said sprocket between said recesses having radially outwardly and forwardly facing shoulders arranged to drivingly engage said rounded surfaces on said link members and rearwardly diverging edges conforming in spaced relation to said forwardly convex surfaces on the forward ends of said link members.

5. A chain and drive for a tubular type conveyor comprising a plurality of similar links, said links being of equal length and bifurcated at one end and sized at the other end to be received in the bifurcated end of the adjacent link, pivot holes formed through both ends of said links with seal recesses formed around the ends of the pivot hole in said other end of the link, pivot pins passed through said holes in adjacent links and restrained against rotation in the bifurcated ends,
seals positioned around said pins in said recesses,
first longitudinally facing contoured surfaces on one end of said links at the base of the bifurcated portion thereof,
other oppositely longitudinally facing contoured surfaces on the other ends of said links,
said pivot pins connecting said links with spaces between the first contoured surface of one link and the other contoured surface of the adjacent link,
a drive sprocket having teeth pitched equally to the said spaces and engageable with said contoured surfaces,
at least one edge of said teeth having a radially outwardly facing surface adapted to support one of said contoured surfaces,
said sprocket having radial recesses formed between said teeth,
and flight plates secured to each of said links in positions to project into said recesses in said sprocket.

6. A chain and drive for a tubular conveyor comprising a plurality of similar links,
said links being of equal length and bifurcated at one end and sized at the other end to be received in the bifurcated end of the adjacent link,
pivot holes formed through both ends of said links,
pivot pins passed through said holes in adjacent links,
first longitudinally facing contoured surfaces on one end of said links,
other oppositely longitudinally facing contoured surfaces on the other ends of said links,
said pivot pins connecting said links with spaces between the first contoured surface of one link and the other contoured surface of the adjacent link,
a drive sprocket having teeth pitched equally to the said spaces and sized to enter said spaces and engageable with said contoured surfaces,
at least one edge of said teeth having a radially outwardly facing surface adapted to support one of said contoured surfaces,
said sprocket having radial recesses formed between said teeth,
and flight plates fixedly secured to each of said links and projecting from all sides thereof in positions to project into said recesses in said sprocket.

7. In a conveyor having a material translating tube and a drive sprocket for pulling a sectional linked conveyor through said tube, said sprocket having radially projecting teeth with recesses therebetween that are angularly enlarged relative to said teeth, said sectional linked conveyor comprising
a plurality of similar links with one end convexly rounded about an axis parallel to the axis of rotation of said sprocket and longitudinally outwardly of the end of the link,
the other end of each link being bifurcated by a slot in the plane of said sprocket,
a second rounded surface formed on each link on the base of the slot therein and oppositely convex to said one rounded end about an axis parallel to the axis of curvature of said one rounded end,
pivot pins connecting said one end of said links with the bifurcated other end of an adjacent link with space between the rounded surfaces on the adjacent ends of said links,
and pusher flights secured to said links at points spaced between said rounded surfaces and projecting therefrom completely around said links,
said teeth on said sprocket being sized and positioned to enter said space between said rounded surfaces of adjacent links and between the bifurcations of said links,
at least one side of said teeth having radially outwardly facing portions disposed in radially inwardly spaced relation to the outer end of the tooth to engage one of said rounded surfaces.

8. A conveyor as defined in claim 7 in which said pivot pins are nonrotatably engaged with the bifurcated ends of said links.

9. A conveyor as defined in claim 8 in which there are annular flexible seals positioned around said pivot pins at each side of said one end of said link and retained thereagainst by the bifurcations of the adjacent link connected thereto.

References Cited by the Examiner

UNITED STATES PATENTS 22,577,082  12/1951  Hudson _____ 198—168

FOREIGN PATENTS 261,717  6/1927  Great Britain.
282,845  12/1927  Great Britain.
34,003  2/1931  Poland.

ANDRES H. NIELSEN, *Primary Examiner.*

EDWARD A. SROKA, *Examiner.*